W. W. WILKINSON.
CASING TONGS.
APPLICATION FILED OCT. 7, 1912.

1,086,257.

Patented Feb. 3, 1914.

Witnesses
E. R. Peard
W. T. Keene

Inventor.
Wilcie W. Wilkinson.
by
Hazard & Mause
Attys.

UNITED STATES PATENT OFFICE.

WILCIE W. WILKINSON, OF SANTA PAULA, CALIFORNIA.

CASING-TONGS.

1,086,257. Specification of Letters Patent. Patented Feb. 3, 1914.

Application filed October 7, 1912. Serial No. 724,355.

*To all whom it may concern:*

Be it known that I, WILCIE W. WILKINSON, a citizen of the United States, residing at Santa Paula, in the county of Ventura and State of California, have invented a new and useful Improvement in Casing-Tongs, of which the following is a specification.

This invention relates to casing tongs used in handling deep well casings during their introduction or withdrawal, and the principal object is to provide a gripping mechanism for such tongs that is easily removable from engagement with the casing without material disarrangement of the parts.

It is also an object to provide a device that is reversible without removing the tongs from the casing.

It is a further object to provide casing tongs positive in its gripping action, the gripping parts being supported on the operating lever in an easily applied position.

Figure 1:
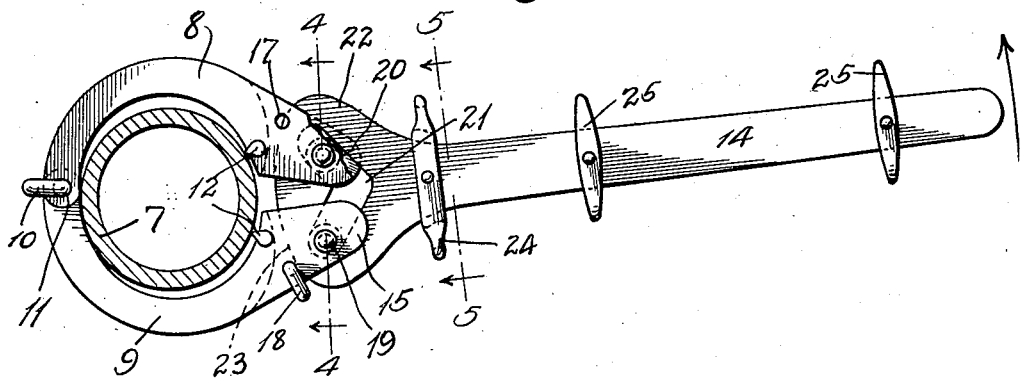
Figure 2:
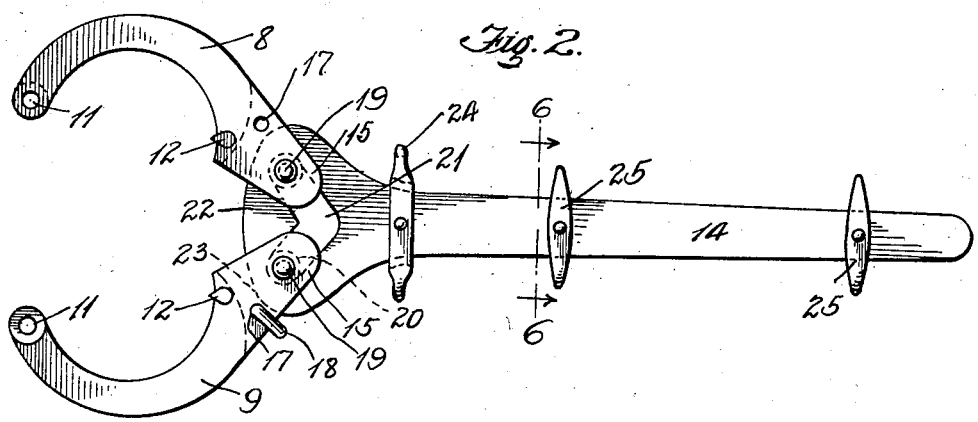
Figure 3:
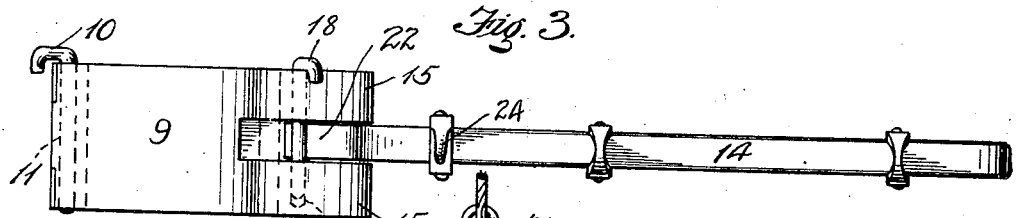
Figures 4, 5:
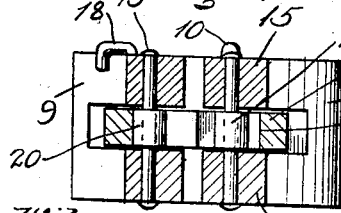
Figure 6:
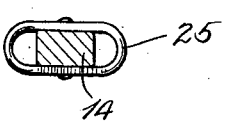

In the drawings accompanying this specification Figure 1 is a plan view of the tongs, showing them applied to a section of casing, shown in cross section. Fig. 2 is a plan view showing the gripping jaws uncoupled by the hinge pin, and in position to be applied to the casing. Fig. 3 is a side elevation of the tongs as illustrated in Fig. 1. Fig. 4 is a cross section on the line 4—4 of Fig. 1, looking in the direction of the arrows. Fig. 5 is a cross section on the line 5—5, showing the supporting chains in engagement with the supporting hooks. Fig. 6 is a section on the line 6—6 of Fig. 2, looking in the direction of the arrows.

Heretofore casing tongs have been provided with gripping means which have to be removed from the casing to reverse the action of the tongs.

This invention provides a gripping mechanism that can be reversed by the changing of one pin, removably secured in the jaws.
More specifically in the drawings like numerals indicate similar parts in the different views, 7 designating a section of the casing inclosed by the jaws 8 and 9 of the improved casing tongs, hinged at their free ends by means of the hinge pin 10 which is passed through the bores 11, axially disposed to the jaws. These jaws are of the general semi-cylindrical form, the inner periphery being slotted radially of the casing to receive the teeth 12, preferably formed of a harder metal than the jaws themselves, and ground to a configuration shown in the drawings, providing a sharp engaging edge.

Portions of the jaws adjacent to the operating lever 14 are extended, as shown, to form the lugs 15 which embrace the inner end of the lever 14, in the slot formed by the pair of extending lugs 15. These lugs are provided with a plurality of bores which extend parallel and axially in relation to the casing through the lugs, parallel with the hinge bores 11. The two inner bores 17 are provided for the reception of the pin 18 acting as a cam or stop to limit the movement of the operating lever on the side on which the pin is inserted.

The outer bores are provided to receive the pins 19 which are permanently secured in the jaws after the device is assembled. Preferably mounted on these pins are the rollers 20 interposed in the slot formed by the adjacent lugs 15, these rollers being embraced and adapted to roll in the angular or V-shaped slot 21 formed in the headed extension 22 of the operating lever 14. This headed extension 22 is wider from side to side of the lever, and is provided with the curved bearing surfaces 23 which bear against the pin 18 when the latter is placed in position, the pivot pin 19 adjacent to the cam pin being converted thereby into a pivot or fulcrum for the leverage exerted by the operating lever.

The slot 21 is, as shown, of such configuration that the straight-away portions and constituting the engaging portions of the slot are placed at an angle of approximately 100° and is of such width that the rollers 20 are readily rolled therein without undue friction or movement thereto, the apex being away from the casing engaging members though this position may be reversed.

As clearly shown in Fig. 1, the movement of the lever in the direction of the arrow throws the inclined edge acting as a cam, of the outer sides of the slot against the roller, the other roller 20 being held in pivotal relation in the terminal end of its portion of the slot by the pin 18.

To support the device and lift the section of the casing to which the tongs is applied, hooks 24 are provided on the strap secured as close to the inner end of the lever as is practical. Loop straps 25 are also secured on either side of the lever to which a line may be secured to guide the device when it is lifted out of reach of an operator to engage or release the action of the lever.

As can readily be seen by shifting the cam pin 18 to the opposite jaw, the gripping direction is reversed without moving the jaws from the casing, and the jaws are easily operated when the lever occupies the central relation as shown in Fig. 2, by removing the hinge pin 10.

The tongs could be bushed so that they could be applied to smaller sizes of casing, the bushing being secured by any suitable means.

What I claim is:

1. Casing tongs, comprising a plurality of hinged casing engaging members, their free ends being provided with engaging lugs, and an operating lever having through it the V-slot engaging said lugs to draw them together to grip a casing embraced thereby.

2. A symmetrical and reversible casing tongs, comprising a pair of hinged casing engaging members, having bores in their free ends, pins secured in said bores, a lever having a single slot embracing and inclosing said pins, and means to limit the movement of said lever in relation to one of said pins and its member whereby said lever draws the free ends of said hinged members into gripping engagement.

3. A reversible casing tongs, comprising a pair of members formed with semi-cylindrical recesses, means to hinge together said members, pins secured in the unhinged ends of each of said members, a lever having an angular slot with edges inclined away from said hinged casing members and adapted to embrace said pins, and interchangeable means to hinge the lever to one of said pins whereby the movement of said lever slides the other of said pins in said slots, to draw said members to a gripping engagement.

4. Casing tongs comprising a pair of semi-circular casing engaging members having slotted lugs at one of their ends and means to hinge together the oppositely disposed ends, bores carried through the slots in said lugs, pins adapted to fit in the nearest of said bores, a lever having a V shaped slot in one end adapted to receive said pins the apex of said slot pointing away from said casing members and a stop adapted to be inserted in one of said bores oppositely disposed in said lugs from a pin in said V slot whereby said lever is hinged in relation to said pin and the other lug of said slot acts as a cam face and forces said other pin and its casing member to a gripping action.

5. Casing tongs comprising a plurality of casing engaging members adapted to be hinged together, their oppositely disposed ends having lever engaging lugs and a lever having an angularly formed slot of substantially V form adapted to receive and engage said lever engaging lugs, the lever hinging on one lug and the other adapted to slide in the other portion of said angular slot.

In witness that I claim the foregoing I have hereunto subscribed by name this 30th day of September 1912.

WILCIE W. WILKINSON.

Witnesses:
 ROY WILKINSON,
 JAS. F. STEWART.